United States Patent [19]

Bertino et al.

[11] 4,396,545

[45] Aug. 2, 1983

[54] BIS(ARYLAZO)DIIMIDES PIGMENTS

[75] Inventors: Clarence D. Bertino; Robert W. Hill, both of Houston, Tex.; James E. Owen, Shaker Heights, Ohio

[73] Assignee: Gulf Oil Corporation, Pittsburgh, Pa.

[21] Appl. No.: 261,398

[22] Filed: May 7, 1981

[51] Int. Cl.³ .................... C09B 43/00; C09B 43/40; C09B 1/44; C09B 5/06

[52] U.S. Cl. ............................... 260/152; 106/288 Q; 106/141; 106/205; 106/206; 106/500

[58] Field of Search ................................ 260/152, 157

[56] References Cited

U.S. PATENT DOCUMENTS 3,332,931  7/1967  Braun et al. .................... 260/152
3,346,551 10/1967  Anton ............................. 260/152
3,402,166  9/1968  Heckl et al. .................... 260/152
3,732,200  5/1973  Bach ............................ 260/152 X

FOREIGN PATENT DOCUMENTS 1213994 11/1970  United Kingdom ............... 260/152
1221181  2/1971  United Kingdom ............... 260/152
1221182  2/1971  United Kingdom ............... 260/152
1224739  3/1971  United Kingdom ............... 260/152

Primary Examiner—Floyd D. Higel
Attorney, Agent, or Firm—Deane E. Keith; Forrest D. Stine; Richard L. Kelly

[57] ABSTRACT

The products of the invention are high melting, highly insoluble N,N'-bis(arylazo)diimides prepared by reacting 2 mols of an arylazoaromatic amine with pyromellitic acid dianhydride or 3,3',4,4'-benzophenone tetracarboxylic acid dianhydride. The products are colored and useful as pigments in surface coating compositions and plastics.

46 Claims, No Drawings

BIS(ARYLAZO)DIIMIDES PIGMENTS

BACKGROUND OF THE INVENTION (a) Field of the Invention

The invention relates to certain bis(arylazo)diimide compounds and methods for their preparation.

(b) Description of the Prior Art

It is known that many dyestuffs and organic pigments contain azo groups and/or imide groups. To the best of the applicants' knowledge, no known organic pigments contain azo groups and imide groups in the structural arrangement contained in the compounds disclosed and claimed herein.

SUMMARY OF THE INVENTION

The products of the invention are high melting, highly insoluble N,N'-bis(arylazo)diimides having the structure:

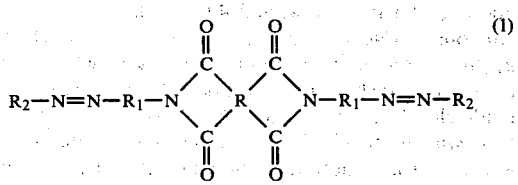

where R has the structure:

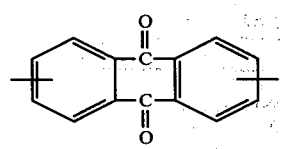

where $R_1$ is a phenylene group bearing up to 2 substituent groups, or a naphthylene group bearing up to 2 substituent groups or has the structure:

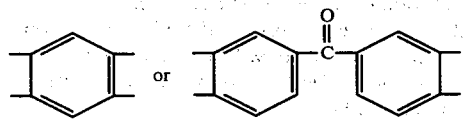

and where $R_2$ is a phenyl group bearing up to 2 substituent groups, or a naphthyl group bearing up to 2 substituent groups, or has the structure:

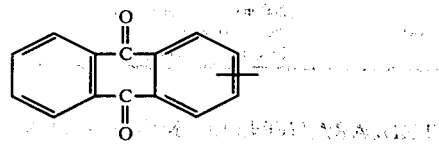

with the further limitation that any substituents on $R_1$ or $R_2$ are independently selected from the group consisting of an alkyl group containing up to 3 carbon atoms, an alkoxy group containing up to 3 carbon atoms, a chlorine atom, a bromine atom, a nitro group, a trifluoromethyl group, a cyano group, an acetyl group or a benzoyl group. A typical compound of the invention is N,N'-bis [4-(phenylazo)phenyl] benzophenone tetracarboxylic diimide which has the structure:

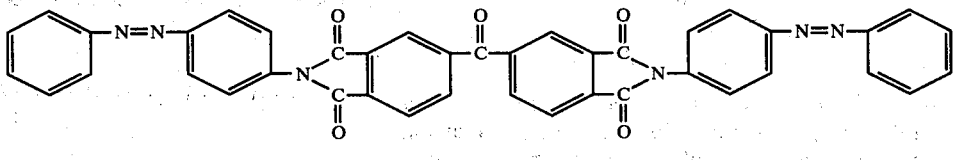

DETAILED DESCRIPTION OF THE INVENTION

The bis(arylazo)diimide compounds of the invention are prepared by reacting an arylazoaromatic amine with a dianhydride of an aromatic tetracarboxylic acid in a suitable solvent.

The aromatic tetracarboxylic acid dianhydride employed is either pyromellitic acid dianhydride (PMDA) or 3,3',4,4'-benzophenone tetracarboxylic acid dianhydride (BTDA), both of which are known compounds. The dianhydrides conform to the structure:

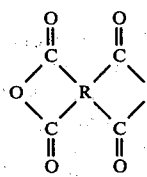

where R has the structure:

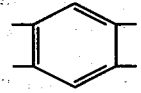

in the case of PMDA, and the structure:

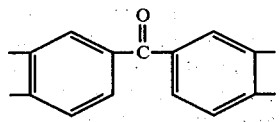

in the case of BTDA.

The arylazoaromatic amines employed conform to the structure:

(2) $R_2—N=N—R_1—NH_2$ where $R_1$ is a phenylene group bearing up to 2 substituent groups, or a naphthylene group bearing up to 2 substituent groups, or has the structure:

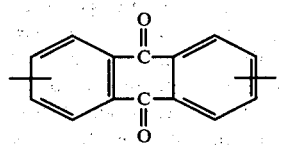

and where $R_2$ is a phenyl group bearing up to 2 substituent groups, or a naphthyl group bearing up to 2 substituent groups, or has the structure:

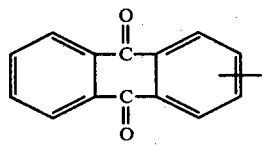

Any substituents on $R_1$ or $R_2$ are independently selected from the group consisting of an alkyl group containing up to 3 carbon atoms, an alkoxy group containing up to 3 carbon atoms, a chlorine atom, a bromine atom, a nitro group, a trifluoromethyl group, a cyano group, an acetyl group, or a benzoyl group. A typical arylazoaromatic amine employed in the invention is 4-phenylazoaniline. This compound has the structure:

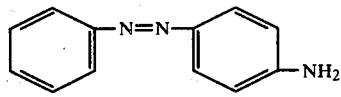

Many of the arylazoaromatic amines employed in the invention are believed to be new compounds not described in the literature. Methods for preparing such compounds are described infra.

To prepare the bis(arylazo)diimide products, one molar portion of the dianhydride component, PMDA or BTDA, is dissolved or suspended in an anhydrous solvent such as glacial acetic acid, or N-methyl-2-pyrrolidone (NMP). While stirring this solution or suspension, two molar portions of the arylazoaromatic amine are slowly added thereto with stirring. The amine groups react with the anhydride groups to form amic acids. This reaction proceeds readily at ambient temperature or slightly elevated temperatures. To complete the reaction and form the desired imide groups, the first intermediate reaction product containing amic acid groups is heated to an elevated temperature to remove water from the amic acid groups to effect ring closure and form imide groups. When glacial acetic acid is employed as the reaction medium, simple refluxing is sufficient to effect the ring closure. When NMP is employed as the reaction solvent, an aromatic hydrocarbon such as xylene is added to the system which then is heated to reflux temperature to remove water as an azeotrope with the aromatic hydrocarbon.

The arylazoaromatic amines of formula (2) can be prepared by first forming an aromatic diazonium chloride salt from an aromatic amine having the formula $R_2$—$NH_2$ where $R_2$ has the same significance discussed supra. In the next step of the process, an N-methane sulfonic acid salt is prepared by reacting an aromatic amine having the formula $R_1$—$NH_2$ with formaldehyde and sodium bisulfite. In this formula, $R_1$ has the same significance discussed supra. Throughout the specification, the N-methane sulfonic acid salts of the aromatic amines will be referred to as the "omega acid" of the aromatic amine. In the third step of the process, the diazonium chloride salt of the aromatic amine, $R_2$—$NH_2$, is reacted with the omega acid of the aromatic amine, $R_1$—$NH_2$, to form an azoamine-omega acid. In the final step of the process, the azoamine-omega acid is hydrolyzed with aqueous base to provide the desired arylazoaromatic amine. This series of reactions is illustrated below:

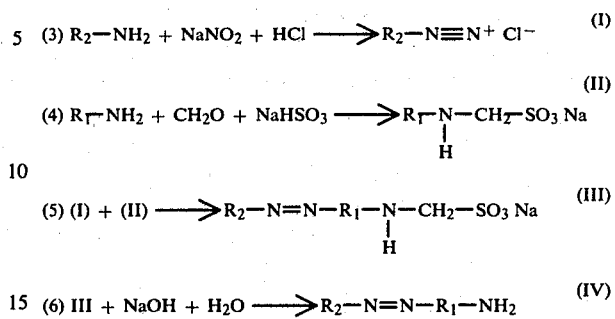

PREPARATION OF DIAZONIUM SALTS

EXAMPLE 1

A glass reactor equipped with mechanical stirrer and thermometer was charged with 100 ml of water, 1 drop of Tween 20 and 34.52 g (0.20 mole) of 2-chloro-4-nitroaniline and stirred at 25° C. for 1 hour. It was then cooled in an ice bath to 0°–5° C. and 40 ml (0.48 mole) of concentrated HCl were added. As the suspension was very thick, an additional 10 ml of water were added. Bits of ice were added to the suspension to help cooling. To it were added 42 ml (0.21 mole) of 5 M aqueous $NaNO_2$ over a period of 10 minutes. Solid began to dissolve in about 10 minutes and the color turned orangish. The addition of $NaNO_2$ solution was made slowly to avoid build-up of $NO_2^-$. The temperature was about 4° C. The amine was insoluble and it appeared that reaction occurred on the surface of particles, thereby slowly dissolving it. Thus, some (3–4 ml) $NaNO_2$ solution was added and the reaction was followed by spot tests for $NO_2^-$ using the known Green reagent. When the test was negative, more $NO_2^-$ was added. The mixture was stirred at 0°–5° C. for one additional hour after all the $NaNO_2$ had been added. A spot test at the end of the hour showed $NO_2^-$ present. The yield was essentially quantitative.

EXAMPLES 2–14

Additional diazonium salts were prepared following the procedure of Example 1. The aromatic amines employed are set forth in Table I.

TABLE I

| Example No. | Aromatic Amine Employed |
| --- | --- |
| 2 | Aniline |
| 3 | 4-Nitroaniline |
| 4 | 4-Cyanoaniline |
| 5 | 3-Acetylaniline |
| 6 | 4-Methoxyaniline |
| 7 | 4-Chloro-1-naphthylamine |
| 8 | 1-Aminoanthraquinone |
| 9 | 3,5-Dimethylaniline |
| 10 | 2-Nitro-4-chloroaniline |
| 11 | 2-Chloro-5-trifluoromethylaniline |
| 12 | 2-Benzoyl-4-chloroaniline |
| 13 | 2-Bromo-4-nitroaniline |
| 14 | 2-Nitro-4-methoxyaniline |

PREPARATION OF OMEGA ACIDS

EXAMPLE 15

A glass reactor equipped with a mechanical stirrer, thermometer and condenser was charged with 600 ml of H$_2$O, 95.6 g (0.92 mole) of NaHSO$_3$ and 74.0 g (0.91 mole) of 37% formalin solution. The solution was heated to 65° C. and stirred for one hour.

The pH of the solution was about 4.8. A small charge (2 ml) of formalin solution was added to adjust the pH to about 5.0. There then was charged 98.6 g (0.80 mole) of 2-methoxyaniline over a period of 15 minutes. The solution was maintained at about 65° C., while stirring was continued for a 2-hour period. Upon cooling to ambient temperature, the omega acid precipitated as gray-white crystals.

EXAMPLE 16-20

A series of additional omega acids were prepared following the procedure of Example 17. The aromatic amines employed are set forth in Table II.

TABLE II

| Example No. | Aromatic Amine Employed |
|---|---|
| 16 | Aniline |
| 17 | 3,5-Dimethylaniline |
| 18 | 2,5-Dimethoxyaniline |
| 19 | 4-Methoxyaniline |
| 20 | 4-Nitroaniline |

PREPARATION OF ARYLAZOAROMATIC AMINES

EXAMPLE 21

Part A

A glass reactor equipped with a mechanical stirrer and thermometer was charged with 0.2 mole of the omega acid of 2-methoxyaniline (from Example 15), about 200 ml of water, and 20 g of sodium bicarbonate to provide a solution having a pH of about 7.5. The solution then was cooled to about 7°-9° C. A solution containing about 0.2 mole of the diazonium salt formed from 2-chloro-4-nitroaniline (from Example 1) was first treated with the minimum quantity of sulfamic acid required to destroy any excess nitrite ions. The absence of nitrite ions was assured by testing with Green reagent. The solution then was cooled to about 10° C. and was added to the omega acid solution with stirring over a period of about 45 minutes. The pH was adjusted to about 7.0 by the addition of 3 g of soldium bicarbonate. After standing overnight, the pH was about 7.2. The precipitate was filtered and washed with 5% NaCl solution.

Part B

The filter cake of Part A and 1250 ml of H$_2$O were charged to a glass reactor equipped with a mechanical stirrer and thermometer and stirred until a homogeneous dispersion was obtained. Twenty-five ml of 50% aqueous NaOH were added and the mixture was heated to 85° C. during 1 hour, stirred at 85° C. for 2 hours, cooled to 60° C., filtered, and washed with 200 ml of ice-cold water. The product was dried in a vacuum oven at 85°-90° C. for 16 hours to yield 40.6 g (66.2% of theory) of dark maroon solid, mp 148°-156° C.

EXAMPLES 22-45

Several additional arylazoaromatic amines were prepared following the procedure of Example 21. The diazonium salts and the omega acids employed are shown in Table III.

TABLE III

| Example No. | Diazonium Salt Source (Example No.) | Omega Acid Source (Example No.) |
|---|---|---|
| 22 | 1 | 15 |
| 23 | 2 | 15 |
| 24 | 2 | 16 |
| 25 | 3 | 16 |
| 26 | 3 | 15 |
| 27 | 3 | 17 |
| 28 | 3 | 18 |
| 29 | 4 | 15 |
| 30 | 4 | 18 |
| 31 | 5 | 15 |
| 32 | 6 | 16 |
| 33 | 7 | 15 |
| 34 | 8 | 15 |
| 35 | 9 | 16 |
| 36 | 9 | 20 |
| 37 | 10 | 15 |
| 38 | 10 | 17 |
| 39 | 11 | 15 |
| 40 | 11 | 17 |
| 41 | 12 | 15 |
| 42 | 12 | 17 |
| 43 | 13 | 18 |
| 44 | 13 | 17 |
| 45 | 14 | 17 |

The arylazoaromatic amines employed as an intermediate in the practice of the invention can be prepared by alternate synthesis routes. In one such alternate route, one molar portion of primary aromatic amine is partially diazotized with 0.5 molar portion of nitrous acid. The diazonium salt formed couples with the excess of the aromatic amine to provide the corresponding triazene. Such triazenes can be reacted with aniline hydrochloride (or equivalent primary aromatic amine hydrochloride) in ethanol as reported by Nietzki Ber. 10, 622(1877). Employing this technique, the applicants prepared 4-amino-4'-methoxyazobenzene; 4-amino-4'-chloroazobenzene; 4-(4-methylphenylazo) aniline; and 2-(4-methylphenylazo)-4-methylaniline.

PREPARATION OF BIS(ARYLAZO)DIIMIDES

EXAMPLE 46

A 3-necked flask equipped with a mechanical stirrer, thermometer, Barrett trap, and condenser was flushed with nitrogen and charged with 10.6 g (0.033 mole) of BTDA and 170 ml of NMP. To it were added 20.3 g (0.066 mole) of 2-methoxy-4-(2-chloro-4-nitrophenylazo)aniline (the product of Example 21) over a period of 20 minutes. Xylene (120 ml) was then added and the solution was heated to effect the imidization and distill the xylene/water azeotrope. Distillation began at a pot temperature of 160° C. and was continued for six hours until the pot temperature reached 165° C. The reaction mixture was cooled and added to 700 ml of methanol. The precipitate was filtered off and washed twice with 500 ml portions of methanol by resuspension and filtering. The product was dried in a vacuum oven at 100° C. for 16 hours to yield 18.4 g (62% of theory) of maroon-brown solid, mp 212°-218° C. The IR spectrum of this solid contained the imide carbonyl absorptions at 1740 cm$^{-1}$ and 1780 cm$^{-1}$.

EXAMPLES 47-75

Several additional bis(arylazo)diimide compounds were prepared by reacting arylazoaromatic amines with BTDA following the procedure of Example 46. The identity of the arylazoaromatic amine employed, the product's melting point, and the product's color are shown in Table IV. Where blanks appear, observations or measurements were not made.

TABLE IV

| Example No. | Arylazoaromatic Amine Source (Example No.) | Melting Point °C. | Color |
|---|---|---|---|
| 47 | 22 | 212–218 | Maroon |
| 48 | 23 | 186–195 | Orange |
| 49 | (1) | 407 | Orange |
| 50 | 25 | 278–284 | Brown |
| 51 | 26 | 176–183 | Maroon |
| 52 | 27 | >350 | Brown |
| 53 | 28 | 214–240 | Brown |
| 54 | 29 | 271–280 | Red |
| 55 | 30 | 231–239 | Brown |
| 56 | 31 | >350 | Orange |
| 57 | 32 | 385 | Brown-Grey |
| 58 | 33 | 200–206 | Light Brown |
| 59 | 34 | 183–190 | Brown |
| 60 | 35 | 263–287 | Brown |
| 61 | 37 | 185–192 | Light Brown |
| 62 | 38 | >350 | Brown |
| 63 | 39 | 365 | Brown |
| 64 | 40 | 190–208 | Brown |
| 65 | 41 | 172–206 | Orange |
| 66 | 42 | 177–198 | Orange |
| 67 | 43 | 256–272 | Brown |
| 68 | 44 | >350 | Brown |
| 69 | 45 | 210–230 | Brown |
| 70 | (2) | 261–264 | Orange |
| 71 | (3) | — | Maroon |
| 72 | (4) | 404 (with decomp) | Yellow |
| 73 | (5) | 385 | Olive Green |
| 74 | (6) | 378 (with decomp) | Yellow |
| 75 | (7) | >300 | Peach |

Footnotes to Table IV
(1) 4-Phenylazoaniline (purchased material).
(2) 2-Methyl-4-(2-methylphenylazo)aniline (purchased material).
(3) 4-Phenylazo-1-naphthylamine (purchased material).
(4) 4-(4-Chlorophenylazo)aniline*
(5) 4-(4-Methoxyphenylazo)aniline*
(6) 4-(4-Methylphenylazo)aniline*
(7) 2-(4-Methylphenylazo)-4-methylaniline*
*Prepared by Nietzki method noted supra.

EXAMPLE 76

The product of Example 49 was prepared by an alternate procedure employing glacial acetic acid as the reaction medium. A suspension of 16.1 g (0.105 mole) of powdered BTDA in 150 ml of glacial acetic acid was stirred and 19.7 g (0.1 mole) of 4-phenylazoaniline was added in parts during 15 minutes at room temperature. A slight exothermic reaction (~5° C.) was observed. The product then was refluxed for 16 hours. After cooling, the product was washed with water and dried to provide a product identical in appearance to the product of Example 49.

EXAMPLES 77–80

Four arylazodiimides were prepared from PMDA employing the procedure of Example 46. The arylazoaromatic amines employed were 4-phenylazoaniline (Example 77); 4-(2-Chloro-5-trifluorophenylazo)-3-methoxyaniline (Example 78); 4-(2-nitro-4-methoxyphenylazo)-2,6-dimethylaniline (Example 79); and 4-(2-Bromo-4-nitrophenylazo)-2,6-dimethylaniline (Example 80).

The bis(arylazo)diimides have deep colors, have high melting points, and are insoluble in most organic solvents. For this reason, they can be used as organic pigments in surface coating compositions and in thermoplastics. As is known in the art, materials to be used as organic pigments should be ground to a small particle size so as to have a large surface area, e.g., 10 square meters/gram or more. The compounds of the invention can be ground to such particle sizes by grinding techniques that are well known in the art, such as salt grinding as disclosed in U.S. Pat. No. 2,844,484; U.S. Pat. No. 2,844,485; and U.S. Pat. No. 2,844,581.

To prepare attractive colored polystyrene compositions, one part of any of the bis(arylazo)diimides can be dry blended with one thousand parts of a finely ground, colorless polystyrene crystal containing about 0.2% stearic acid as a lubricant. The blending can be carried out in a conventional tumbling type blender. The mixture can be extruded at temperatures of about 450°–500° F. to form strands which then can be cut into pellets of a size suitable for use in an injection molding machine. Test molding specimens measuring 3"×7"×¼" have attractive colors.

What is claimed:

1. An N,N'bis(arylazo)diimide having the structure:

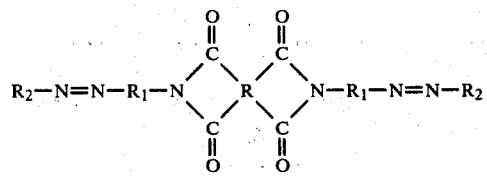

where R has the structure:

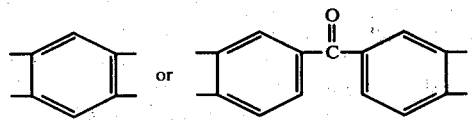

where $R_1$ is phenylene bearing up to 2 substituents, or naphthylene bearing up to 2 substituents, or has the structure:

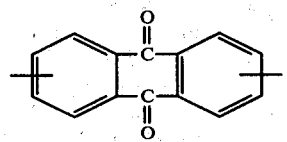

and where $R_2$ is phenyl bearing up to 2 substituents, or naphthyl bearing up to 2 substituents, or has the structure:

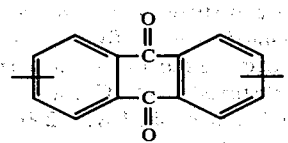

with the further limitation that any substituents on $R_1$ or $R_2$ are independently selected from the group consisting of alkyl containing up to 3 carbon atoms, alkoxy containing up to 3 carbon atoms, chlorine, bromine, nitro, trifluoromethyl, cyano, acetyl or benzoyl.

2. An N,N' bis(arylazo)diimide of claim 1 in which R has the structure:

3. An N,N' bis(arylazo)diimide of claim 1 in which R has the structure:

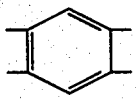

4. An N,N' bis(arylazo)diimide of claim 1 in which $R_1$ is phenylene and $R_2$ is phenyl.

5. An N,N' bis(arylazo)diimide of claim 2 in which $R_1$ is phenylene group and $R_2$ is phenyl group.

6. An N,N' bis(arylazo)diimide of claim 3 in which $R_1$ is phenylene and $R_2$ is phenyl.

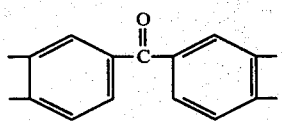

7. A bis(arylazo)diimide of claim 4 in which neither the phenyl nor the phenylene bears a substituent.

8. A bis(arylazo)diimide of claim 6 in which the phenyl bears an acetyl substituent.

9. A bis(arylazo)diimide of claim 8 in which the phenylene bears a methoxy substituent.

10. A bis(arylazo)diimide of claim 4 in which the phenyl bears a nitro substituent.

11. A bis(arylazo)diimide of claim 10 in which the phenylene bears a methoxy substituent.

12. A bis(arylazo)diimide of claim 10 in which the phenylene bears two methyl substituents.

13. A bis(arylazo)diimide of claim 10 in which the phenylene bears two methoxy substituents.

14. A bis(arylazo)diimide of claim 6 in which the phenyl bears one methyl substituent.

15. A bis(arylazo)diimide of claim 14 in which the phenylene bears one methyl substituent.

16. A bis(arylazo)diimide of claim 7 in which the phenyl bears one cyano substituent.

17. A bis(arylazo)diimide of claim 16 in which the phenylene bears one methoxy substituent.

18. A bis(arylazo)diimide of claim 16 in which the phenylene bears two methoxy substituents.

19. A bis(arylazo)diimide of claim 6 in which the phenyl bears one chloro substituent.

20. A bis(arylazo)diimide of claim 6 in which the phenyl bears two methyl substituents.

21. A bis(arylazo)diimide of claim 6 in which the phenyl bears one nitro substituent and one chloro substituent.

22. A bis(arylazo)diimide of claim 21 in which the phenylene bears one methoxy substituent.

23. A bis(arylazo)diimide of claim 21 in which the phenylene bears two methyl substituents.

24. A bis(arylazo)diimide of claim 4 in which the phenyl bears one chloro substituent and one trifluoromethyl substituent.

25. A bis(arylazo)diimide of claim 24 in which the phenylene bears one methoxy substituent.

26. A bis(arylazo)diimide of claim 24 in which the phenylene bears two methyl substituents.

27. A bis(arylazo)diimide of claim 6 in which the phenyl bears one benzoyl substituent and one chloro substituent.

28. A bis(arylazo)diimide of claim 27 in which the phenylene bears one methoxy substituent.

29. A bis(arylazo)diimide of claim 27 in which the phenylene bears two methyl substituents.

30. A bis(arylazo)diimide of claim 6 in which the phenyl bears one nitro substituent and one methoxy substituent.

31. A bis(arylazo)diimide of claim 30 in which the phenylene bears two methyl substituents.

32. A bis(arylazo)diimide of claim 4 in which the phenyl bears one bromo substituent and one nitro substituent.

33. A bis(arylazo)diimide of claim 32 in which the phenylene bears two methyl substituents.

34. A bis(arylazo)diimide of claim 32 in which the phenylene bears two methoxy substituents.

35. A bis(arylazo)diimide of claim 6 in which the phenyl bears one methoxy substituent.

36. A bis(arylazo)diimide of claim 5 in which neither the phenyl nor the phenylene bears a substituent.

37. A bis(arylazo)diimide of claim 4 in which the phenylene bears one methoxy substituent.

38. A bis(arylazo)diimide of claim 4 in which the phenylene contains two methyl substituents.

39. A bis(arylazo)diimide of claim 6 in which $R_2$ is naphthyl and $R_1$ is phenylene.

40. A bis(arylazo)diimide of claim 39 in which the naphthyl bears one chloro substituent.

41. A bis(arylazo)diimide of claim 4 in which the phenylene bears one methoxy substituent.

42. A bis(arylazo)diimide of claim 6 in which $R_2$ has the structure:

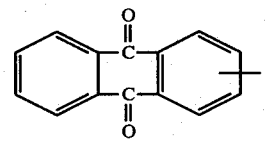

and $R_1$ is phenylene.

43. A bis(arylazo)diimide of claim 42 in which the phenylene bears one methoxy substituent.

44. A bis(arylazo)diimide of claim 4 in which the phenylene bears two methoxy substituents.

45. A bis(arylazo)diimide of claim 4 in which the phenylene bears one methyl substituent.

46. A bis(arylazo)diimide of claim 3 in which $R_1$ is naphthylene.

* * * * *

UNITED STATES PATENT AND TRADEMARK OFFICE
CERTIFICATE OF CORRECTION

PATENT NO. : 4,396,545

DATED : August 2, 1983

INVENTOR(S) : Clarence D. Bertino et al

It is certified that error appears in the above-identified patent and that said Letters Patent is hereby corrected as shown below:

Column 6, line 36, "622" should read -- 662 --.

Claim 16, line 1, "7" should read -- 6 --.

Signed and Sealed this

Fifth Day of June 1984

[SEAL]

Attest:

GERALD J. MOSSINGHOFF

Attesting Officer

Commissioner of Patents and Trademarks